May 30, 1961 H. E. FELLOWS 2,985,926
FOUNDRY MOLD AND FLASK HANDLING APPARATUS
Filed May 2, 1957 3 Sheets-Sheet 1

INVENTOR.
HARRISON E. FELLOWS
BY
Wheeler, Wheeler + Wheeler
ATTORNEYS

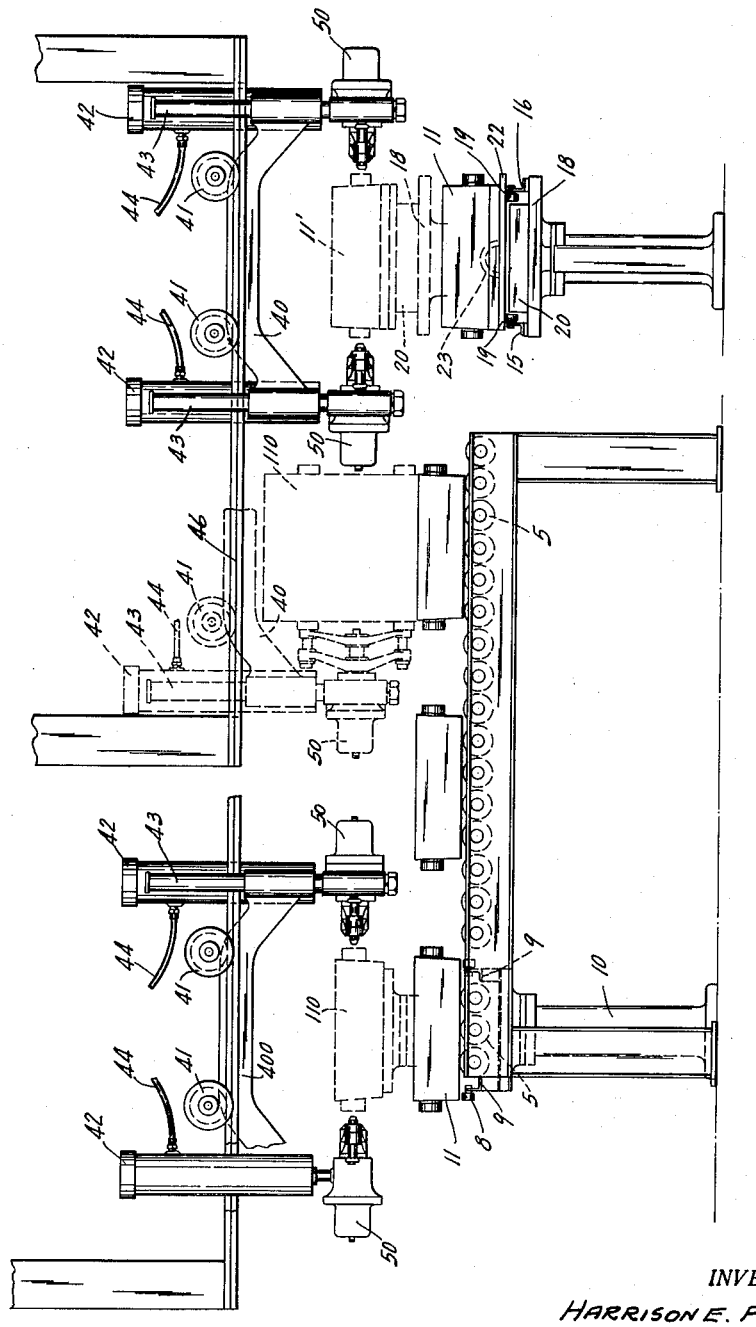

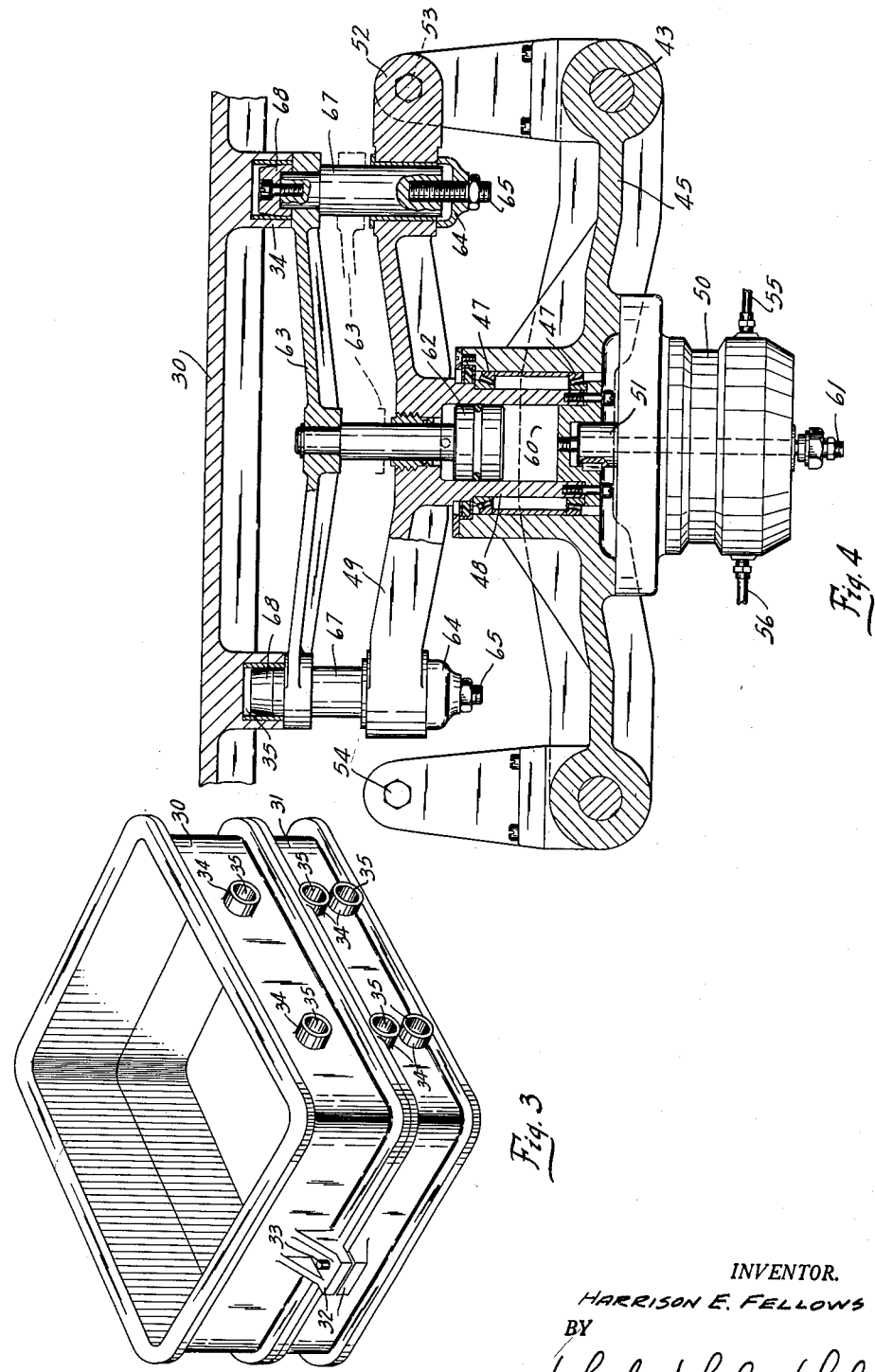

United States Patent Office 2,985,926
Patented May 30, 1961

2,985,926

FOUNDRY MOLD AND FLASK HANDLING APPARATUS

Harrison E. Fellows, Clearwater Lake, Wis.

Filed May 2, 1957, Ser. No. 656,642

17 Claims. (Cl. 22—20)

This invention relates to a foundry mold and flask handling apparatus.

The primary feature of the invention is a conveyor carriage which includes fluid operable lift members which may be actuated individually but which, cooperatively engaged with a specially designed flask, are constrained to function in unison to raise and lower the flask. The lift members include yokes having fluid operated horizontally movable clamps mounted on trunnions for rotation on a common axis, each clamp having laterally spaced dowels for which the flask provides sockets, and the arrangement being such that an engaged flask may be inverted by the rotation of the clamps, desirably by means of power applied to one of them.

The flasks are specially designed to be handled with precision by the carriage above described, each flask being provided with spaced sockets to receive the dowel portions of the conveyor carriage-supported clamps.

The invention includes a mold making apparatus in which the conveyor carriage and flasks above described are advantageously used, the organization including a plurality of conveyors and tables underlying the flasks, and a plurality of the overhead tracks and conveyor carriages above described being organized to transfer flasks and assembled molds from one point to another in the organization.

In the drawings:

Fig. 2 is a view in side elevation of the apparatus shown in Fig. 1.

Fig. 3 is a view in perspective of an assembled cope flask and drag flask made in accordance with the invention.

Fig. 4 is an enlarged detail view partially in plan and partially in horizontal section through a yoke and clamp such as is suspended from each of the carriages of the several overhead conveyors.

Figure 1:
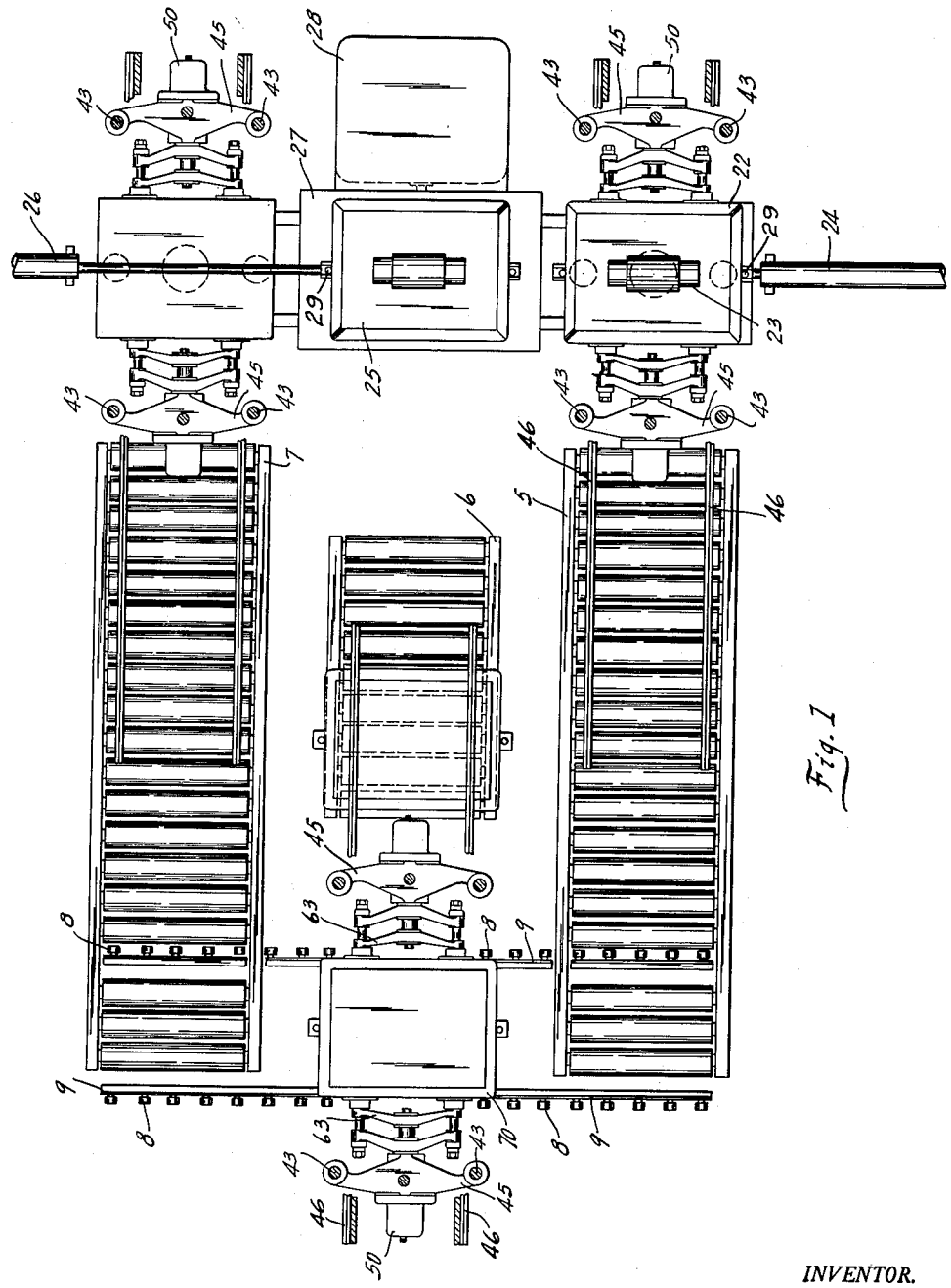
Fig. 1 is a view generally in plan of apparatus embodying the invention, the overhead carriage tracks being only fragmentarily illustrated and the carriages omitted in order to expose the flask clamps and yokes.

In the general organization shown in Fig. 1 and Fig. 2, three parallel roller conveyors are provided at 5, 6 and 7. For transfer transversely, rollers are provided at 8 on bars 9 supported by a fluid operated jack 10. The rollers 8 are normally retracted below the level of the flask 11 as shown in Fig. 2 but may be raised by the jack 10 to lift the flask from the rollers of conveyor 5 or conveyor 7 when it is desired to transfer the flask from either of these conveyors to the center.

At the right hand end of the device as viewed in Fig. 1 and Fig. 2, there are bars 15 and 16 mounted on table 18. Operating to lift the flask 11 from the conveyor rolls 19 of bars 15 and 16 is the ram 20 by which any given flask 11 may be lifted from its full line position to the dotted line position shown at 11′.

Actually the flask 11 does not rest directly on the rollers 19. Interposed is a pattern plate 22 which carries a pattern 23 and is reciprocated by fluid operated ram 24 between advanced and retracted positions. The pattern plate 22 is shown in Fig. 1 in its retracted position while a corresponding pattern plate 25 has been advanced by its ram 26 to the advanced position at the center where the pattern plate is on the fill table 27. The rams 24 and 26 actuate the respective pattern plates 22 and 25 in alternation, the arrangement being such that when a given pattern plate is in its retracted position, the flask on the other pattern plate will be in the advanced position of registry with the fill table 27. Ordinarily the fill table will comprise a part of a conventional squeeze press, here shown only in section at 28. The rams 24 and 26 have upstanding pins 29 having hooked engagement with the respective pattern plates 22 and 25, whereby either pattern plate may be elevated independently of its associated ram by the respective lift table or elevating ram 20.

Empty cope and drag flasks will return to the fill station 27 on conveyor 6, usually in assembly. These flasks may be identical and may correspond either to the flask 30 or the flask 31 shown in Fig. 3. Merely by way of exemplification, I have shown flask 30 assembled as a cope flask with flask 31 used as a drag flask. Both flasks have ears 32 at their ends, the respective ears having registering apertures to receive a locating pin 33. At their sides, both flasks are provided with spaced and laterally projecting bosses 34 in which are provided sockets 35 to receive the locating dowels of the clamps hereinafter described. On the relatively shallow flask 30, only one pair of bosses is provided at each side. On the deeper flask 31, two pairs of such bosses are provided at different levels, the arrangement desirably being such that the distance between the sockets and one of the flask margins will always be the same, regardless of whether one or the other of flasks 30 or 31 is used.

Over each of the roller conveyors 5, 6 and 7 are overhead tracks for a carriage such as that shown at 40. This carriage has grooved wheels 41 which ride upon the tracks 46. The carriage 40 is provided with cylinders 42, in which pistons 43 are operable by means of fluid pressure supplied to the cylinders through the line 44. Piston-supported at each end of carriage 40 is a yoke 45 provided with bearings 47 for the sleeve 48 of the guide member 49. By means of a motor at 50 which has a drive shaft 51 keyed to the sleeve 48, the member 49 can be oscillated in the bearings 47 for 180° to engage its ear 52 selectively with either of the stops 53 or 54 of the yoke. In practice, the motor 50 is a "Hydro-motor" supplied with power through the ducts 55 or 56, but it is immaterial what source of power is used.

The sleeve 48 internally provides a cylinder 60 to which fluid pressure can be admitted through conduit 61 for the operation of the piston 62 to reciprocate the clamp member 63 between the advanced position illustrated in full lines and the retracted position illustrated in dotted lines. The cup-shaped stop members 64 are adjustably threaded to the studs 65 to limit the outward reciprocation of the clamp member 63 under fluid pressure admitted to cylinder 60. Since the flasks may be sectional, the stop members adjustably limit clamping pressure to a value which will not distort the flasks. Each stud 65 is connected to a guide rod 67 reciprocable through the member 49. As a matter of convenience, the dowels 68 which are receivable into sockets 35 of the flasks may be fastened at the ends of the guide rods 67.

The operation is as follows:

The cope mold will be made first and delivered onto conveyor 7. However, the process is best illustrated by describing the operation of making the drag mold. The two are made alternately, the procedures being identical. The pattern plate used beneath the drag, with the pattern on it, if any, is advanced onto the table 27 by means of the ram 24, and the drag flask is taken from the conveyor 6 and placed on the plate 22. This flask is then filled and jolted and/or squeezed at station 27 in accordance with any desired practice. Thereupon the ram 24 is retracted to withdraw the drag pattern plate 22 back on conveyor rolls 19 into registry with the lift table 20.

At the same time, the ram 26 advances pattern plate 25 and pattern, if any, required for the cope. When this pattern plate registers with table 27, the cope flask will be available on conveyor 6 and will be transferred to the pattern plate and filled with sand as was done in the case of the drag.

Meantime, the lift table 20 will have elevated the drag flask 11 on the pattern plate to a height such as to register a pair of sockets 35 at each side of the drag flask with the respective dowels 68 of the opposing clamp members of the overhead carriage 40. The clamp members are then advanced into pressure engagement with the sides of the drag flask, whereupon the table 20 can be lowered to withdraw the pattern plate and pattern. It is conventional in such cases to use vibration. Hence, no specific vibrating means is illustrated.

The overhead conveyor 40 now moves along the rails 46 to a point over the roller conveyor 5. During travel, or after the carriage reaches the desired location, as the case may be, the motor or motors 50 are energized to turn over the mold so that the opening formed by the pattern will be uppermost. The dotted lines at 110 in Fig. 2 show the mold in the course of this roll-over. Engagement of the ear 52 with stop 54 will limit the rotation to 180°. The completed drag mold now moves along table 5 until it reaches the cross conveyor 8, 9 whereby it can be transferred to the close position 70.

A cope mold will previously have arrived at the close position 70 on conveyor 7 and cross conveyor 8, 9. In this position, the cope mold will have been engaged by the clamps 63 of yokes 45 suspended from the carriage 400 operated on the rails 460. When the drag mold arrives at station 70, the cope mold will be lowered by lift rams of carriage 400 to closing position on the drag mold. The cope mold will then be released, the clamps lowered and attached to the drag flask. The flask assembly is then opened, stripped from the mold by raising the yokes and deposited on conveyor 6 for gravity return.

It will be understood that the general organization is greatly condensed for the purposes of this showing, it being intended merely to illustrate the versatility of the carriage conveyor and its fluid operated lifting, clamping and roll-over mechanisms. The device may be used to close or open a mold or to transfer flasks or molds with or without inversion from one point to another or to support a mold during withdrawal of its pattern.

It will be observed that in these various operations, there is no connection whatever between the two yokes and their individual fluid operated lift means except such connection as is provided by the flask as clamped between the yokes. The structure not only provides for uniformity of operation of the respective yokes, but affords great precision and combines speed with accuracy.

I claim:

1. In foundry moulding equipment a device for engaging opposite sides of a work piece between opposing clamping members and thereupon vertically moving the work piece by correspondingly actuating the respective clamping members, the combination with a conveyor carriage having lift means spaced to receive such a work piece between them, of a yoke connected with each lift means to be raised and lowered thereby respecting the carriage, clamping members mounted on the respective yokes and having means for guiding one clamping member on one yoke for movement toward and from the clamping member on the other yoke upon a path toward the clamping member of the other yoke, and means for actuating the said one clamping member upon said path to clampingly engage the work piece between the clamping member of one yoke and the clamping member of the other.

2. The device of claim 1 in which the carriage is provided with wheels, and a pair of elevated and laterally spaced tracks are provided for the wheels.

3. The device of claim 1 in which both clamping members are movable and the several means for actuating the clamping members comprises rams connected between the yokes and respective clamping members, each ram including a cylinder and a fluid operated piston in the cylinder.

4. The device of claim 1 in which both clamping members are movable and the means for actuating the clamping members comprises a cylinder connected with each yoke and a fluid operated piston in the cylinder connected with the respective clamping member, together with adjustable means for limiting clamping pressure.

5. The device of claim 1 in which the respective clamping members are mounted on aligned bearings, at least one of said yokes being provided with means for rotating a clamping member with respect to the yoke.

6. The device of claim 1 in which the yokes are provided with aligned bearing means, the clamping members having shafts rotatable in the aligned bearing means of the yokes, one of the yokes having a motor in operative connection with its clamping member shaft.

7. The device of claim 1 in which the yokes are provided with aligned bearing means, the clamps having shafts rotatable in the aligned bearings means of the yokes, one of the yokes having a motor in operative connection with the clamp shaft in its bearing means, each shaft comprising a cylinder and respective clamps being mounted from the shaft on pistons in the respective cylinders.

8. The device of claim 1 in further combination with a flask providing the sole connection between said clamping members and having sockets for which the clamping members have registering dowels.

9. The device of claim 1 in further combination with a flask engaged by the clamping members, said members having a substantial extent logitudinally of the flask and being provided with means in interlocking connection with the flask to require accurate registration between the flask and the respective members.

10. In a foundry mold and flask handling apparatus, the combination with an overhead track and a wheeled carriage reciprocable thereon, of fluid operable lift means spaced longitudinally of the carriage, a yoke mounted on each said lift means and vertically reciprocable thereon respecting the carriage, means for engaging a mold and including elongated clamp members supported from respective yokes and movable toward and from each other with respect to the yokes and to and from clamping engagement with an intervening mold, means guiding the clamp members for such movement and means for actuating the clamp members independently of the respective yokes, the carriage having means restricting the yokes against participation in clamping means of said clamp members.

11. The device of claim 10 in further combination with a mold flask having elongated side wall portions engaged by respective clamp members, the flask and clamp members having portions in interlocked connection.

12. The device of claim 10 in further combination with an elevator table positioned below a predetermined point in said track and comprising means for raising to the level of said clamp members flask means to be engaged thereby, and a mold flask having lateral portions with which said clamp members are interlockingly engageable.

13. The device of claim 10 in further combination with coaxial means supporting the clamp members for rotation as well as for advancing and retracting movement respecting the yokes.

14. The device of claim 13 in which the clamp member supporting means are provided with trunnions for which the yoke members provide aligned bearings, and the clamp actuating means comprises fluid operated pistons in the respective trunnions.

15. The combination with a mold assembling table and a flask return conveyor leading therefrom, of a pair of mold delivering conveyors at opposite sides of the flask return conveyor, cross conveyor means disposed transversely of the three conveyors aforesaid, pattern plates on the cross conveyor means, and actuating connections for advancing and retracting the pattern plates in alternation to and from the table.

16. The device of claim 15 in which the pattern plates in their retracted positions are in substantial registry with the mold delivering conveyors, overhead track ways paralleling the mold delivering conveyors, and mold conveying carriages on the track ways provided with mold engaging clamping means.

17. The device of claim 16 in which each clamping means comprises a clamping member having dowel means, a pair of yokes adjustably supported from the carriage, and clamp operating rams mounted on the yokes and connected with the clamping means for engaging the clamping means with a mold flask, the mold flask having sockets with which the dowel means are engageable.

References Cited in the file of this patent

UNITED STATES PATENTS

| | | |
|---|---|---|
| 1,343,335 | Prince | June 15, 1920 |
| 1,545,420 | Frazer | July 7, 1925 |
| 2,525,572 | Woody | Oct. 10, 1950 |
| 2,535,656 | Smith | Dec. 26, 1950 |
| 2,559,647 | Legere | July 10, 1951 |
| 2,622,915 | Horn | Dec. 23, 1952 |
| 2,640,234 | Bergami | June 2, 1953 |
| 2,642,307 | Olson | June 16, 1953 |
| 2,648,562 | Olson | Aug. 11, 1953 |
| 2,651,087 | Fellows | Sept. 8, 1953 |
| 2,680,270 | Gedris | June 8, 1954 |
| 2,686,945 | Williams | Aug. 24, 1954 |
| 2,718,679 | Lasater et al. | Sept. 27, 1955 |
| 2,726,429 | Duncan | Dec. 13, 1955 |
| 2,767,865 | Lasater | Oct. 23, 1956 |